(12) United States Patent
Brannon, III et al.

(10) Patent No.: US 8,244,697 B2
(45) Date of Patent: Aug. 14, 2012

(54) VERSIONING SYSTEM FOR ELECTRONIC TEXTBOOKS

(75) Inventors: Rovy F. Brannon, III, Middleton, WI (US); Christopher W. Raasch, Marshall, WI (US)

(73) Assignee: WiSys Technology Foundation, Madison, WI (US)

( * ) Notice: Subject to any disclaimer, the term of this patent is extended or adjusted under 35 U.S.C. 154(b) by 777 days.

(21) Appl. No.: 12/351,597

(22) Filed: Jan. 9, 2009

(65) Prior Publication Data

US 2010/0185594 A1    Jul. 22, 2010

Related U.S. Application Data

(60) Provisional application No. 61/019,969, filed on Jan. 9, 2008.

(51) Int. Cl.
*G06F 17/30* (2006.01)

(52) U.S. Cl. .................. 707/695; 434/317; 715/229

(58) Field of Classification Search .................. None
See application file for complete search history.

(56) References Cited

U.S. PATENT DOCUMENTS

| | | | |
|---|---|---|---|
| 2001/0007980 A1* | 7/2001 | Ishibashi et al. | 705/26 |
| 2005/0022118 A1* | 1/2005 | Wefers et al. | 715/513 |
| 2005/0120303 A1* | 6/2005 | Behbehani | 715/540 |
| 2007/0111185 A1* | 5/2007 | Krebs | 434/350 |
| 2007/0222855 A1* | 9/2007 | Krijn et al. | 348/42 |
| 2007/0255697 A1* | 11/2007 | Seeman | 707/3 |
| 2009/0204663 A1* | 8/2009 | Patwari | 709/203 |
| 2010/0004944 A1* | 1/2010 | Palaniappan | 705/1 |

* cited by examiner

*Primary Examiner* — Jean B Fleurantin
*Assistant Examiner* — Anteneh Girma
(74) *Attorney, Agent, or Firm* — Boyle Fredrickson, S.C.

(57) ABSTRACT

A versioning system for electronic textbooks provided to a variety of textbook readers uses a highly abstracted content file tagged with content identifiers allowing this content file to be readily re-edited into multiple versions compatible with different curricula and suitable for a range of different reader types.

8 Claims, 4 Drawing Sheets

VERSIONING SYSTEM FOR ELECTRONIC TEXTBOOKS

CROSS REFERENCE TO RELATED APPLICATIONS

This application claims the benefit of U.S. provisional application Ser. No. 61/019,969 entitled: Versioning System for Distance Learning Course Material filed Jan. 9, 2008 and hereby incorporated by reference.

BACKGROUND OF THE INVENTION

Distance learning may employ a communication system such as the Internet to deliver educational instruction to individuals at different locations and at convenient times. The student may have a computer communicating with a "learning management system" which is a program managing not only the delivery of course content but also pacing the students and monitoring the students' progress through tests and the like.

The use of computers to deliver and present course materials allows the creation of an "electronic textbook" providing features beyond those available with standard printed texts. For example, an electronic textbook may permit hyperlinking among topics or footnotes, the use of animated images and other interactive learning aids. The electronic textbook may include questions providing interactive quizzes and worksheets.

While electronic textbooks are potentially powerful learning tools, they have some disadvantages. First, the development of an electronic textbook can require considerably more effort than the preparation of a standard textbook with its associated illustrations. An electronic textbook requires the preparation of the underlying "logic" for the interactive learning aids, the delivery of quizzes, and the like. Further, the elements of the electronic textbook, for example animations, sound clips, and high-resolution images, all take additional effort to prepare. The complexity of preparing the electronic textbook can also make it difficult to modify the textbook for updating, special uses, and correction.

The second problem is that, generally, an electronic textbook is authored for a particular display platform that provides the necessary resources for features of the electronic textbook. For example, electronic textbooks having high-resolution images or animated interactive teaching aids are prepared for a personal computer having the necessary processor speed and display resolution. This can limit the use of the electronic textbook on other display platforms including newer display platforms, such as portable devices, cell phones, and the like, without costly modifications. The rapid change of technology and the rapidly changing preferences of students make this an acute problem.

Most textbooks are authored to embrace the requirements of a wide variety of curricula and are published in different versions, for example including or omitting different chapters, depending, for example, on specifications by particular school districts or educational facilities. With printed textbooks, this process of creating textbook versions is relatively simple because the formatting of the textbook (for example page size, printing technique) doesn't change and the new textbook largely requires updated pagination. With electronic textbooks, published for wide variety of different textbook readers, the versioning process can quickly become unwieldy.

SUMMARY OF THE INVENTION

The present invention provides an improved system for development of electronic textbook versions in which the content is abstracted at a very high degree from its order and formatting. This highly abstracted content as authored (a content file), may then be simply versioned by the creation of one or more course version files. The versioning simply performs a mapping of the authored content to a textbook version. In this way, updates to the content file may be propagated to the versions by the same course version file. The components of the content file are tagged with content identification tags that greatly simplify the versioning process by allowing relevant materials to be identified and collected based on content rather than formatting or order.

Specifically, in one embodiment, the present invention provides a system including multiple spatially independent electronic textbook viewers and an electronic computer system communicating with the textbook viewers to provide versioned electronic textbooks. The computer system includes at least one processor and data storage component, the latter holding a content file, multiple course version files, and a publishing program. The content file includes a set of course elements arranged in an author order and being components of an electronic textbook including at least text and images. Each course element has a content identification tag describing its content independent of its display properties. The course version files identify subsets of the course elements in a course version order different from the author order. The publishing engine program executes to create multiple electronic textbook versions for different users by selecting and ordering the content file based on the course version files and to serve the multiple electronic textbook versions to different electronic textbook viewers.

It is thus a feature of at least one embodiment of the invention to provide an improved system for versioning electronic textbooks by providing atomistic course elements identified by content identification tags. By providing a content-oriented source document, versions may be quickly assembled based on content concerns independent of formatting decisions.

The course version files may provide a mapping from the content file without substantial reproduction of the content file so that the course version files may be applied to subsequent updates of the content file to provide updated electronic textbook versions.

It is thus another object of at least one embodiment of the invention to provide a course version file that can be applied to a changing source document to allow multiple versions to automatically track minor changes and updates in the source document.

The data storage component may further hold multiple device files describing formatting characteristics for different electronic textbook viewers and the processor may execute the publishing engine program to create the multiple electronic textbook versions by applying the formatting of at least one device file to the course elements selected by the course version file.

It is thus a feature of at least one embodiment of the invention to separate the versioning process from the formatting process thereby simplifying the versioning process. It is another object of at least one embodiment of the invention to permit the generation of device files that can be re-used with multiple different content files, thereby saving effort in publishing many different electronic texts to a given device. It is yet another object of at least one embodiment of the invention to allow versions for new devices to be generated simply by creating a new device file.

The formatting of the device files may be linked to the content identification tags of the course elements.

It is thus a feature of at least one embodiment of the invention to provide for a formatting system that can be essentially automatic, deriving the necessary information from content information in the originally authored, substantially format-free, content file.

The content identification may include margin tags indicating marginalia, title tags indicating titles summarizing other course elements, question tags indicating questions related to other course elements, and quiz tags related to quiz questions about other course elements.

It is thus a feature of at least one embodiment of the invention to develop a set of content identification tags uniquely suited to electronic textbooks.

The content identification includes logical section tags collecting other course elements in logical sections of thematically related material.

It is thus a feature of at least one embodiment of the invention to permit nonprinting content that captures logical relationships between textbook components.

The device files may provide for a hierarchy of formatting instructions including: (a) course element level formatting instructions associated with content identification tags associated with displayed course elements, (b) page-level formatting instructions associated with displayed course elements within a page defined by the electronic textbook viewer, and (c) section-level formatting instructions related to section level content identification tags. The priority of application of conflicting formatting instruction is from course element level to section level, with course element level formatting instructions overriding section level formatting instructions.

It is thus a feature of at least one embodiment of the invention to blend formatting based on content with formatting based on formatting (for example pagination) with minimal need for user intervention.

The content file may further include viewer requirement tags identifying course elements requiring specialized viewer capabilities for display and the processor may execute the publishing engine program to discourage content elements incompatible with the electronic textbook viewer.

It is thus a feature of at least one embodiment of the invention to provide an automatic basis to accommodate limitations in certain electronic textbook viewers.

In the context of the versioning system described above, the present invention may provide a versioning program working with a content file including a set of course elements being components of an electronic textbook including at least text and images, each course element having a content identification tag and arranged in an author order. The versioning program may generate a course version file by sequentially selecting course elements from the content file to be arranged in a course version order different from the author order and comprising less than all the context elements of the content file. The course version file may provide a mapping from the content file without substantial reproduction of the content file so that the course version file may be applied to subsequent updates of the content file to provide updated electronic textbook versions. The course version file is such that it may be used to compile an electronic textbook by selecting and ordering the content file based on the course version file to produce a electronic textbook version for use by students.

It is thus a feature of at least one embodiment of the invention to provide a tool for versioning electronic textbooks, the tool working within the context of the inventive content file with its content identification tags.

The versioning program may identify course elements by searching for content identification tags.

It is thus a feature of at least one embodiment of the invention to provide a powerful technique for identifying course components based on author-identified and linked content.

The versioning program may select a logical section tag to automatically select all course elements within the logically related section and/or may select individual course elements within logically related sections.

It is thus a feature of at least one embodiment of the invention to permit the author's logical organization to be adopted, speeding the generation of a versioned program, while still permitting complete control of the new version to the level of an individual course element.

The versioning program may allow the addition of new logical section tags not found in the content file to collect logically related identified course elements.

It is thus a feature of at least one embodiment of the invention to permit a wholly new organization of the course elements under new sections while still capturing the benefit of section formatting.

The logic section tags may be associated with a course length value indicating the teaching length of the course elements within the logically related section, and the step of generating the course version file may provide a running total of course length based on selected sections.

It is thus a feature of at least one embodiment of the invention to provide an efficient method of generating a textbook version targeted for a particular number of credit hours.

The content identification tags may include lesson object tags indicating an educational object of content elements and text tags, and wherein multiple text tags may be logically linked to lesson object tags.

It is thus a feature of at least one embodiment of the invention to provide thematic linking among course elements to assist in the generation of a versioned textbook covering certain topics.

The lesson object tags may be nested in a hierarchy, and text tags linked to a given lesson object tag may also be linked to the lesson object tags above the given lesson object tag in the hierarchy.

It is thus a feature of at least one embodiment of the invention to accommodate overlapping and inter-related thematic concepts.

The content identification tags may further include: title tags indicating a title associated with other course elements, question tags indicating questions related to other course elements, reference tags identifying cited references related to other course elements, and quiz tags indicating quiz content about other course elements.

It is thus a feature of at least one embodiment of the invention to isolate a limited but fundamental set of textbook content types.

The content identification tags may include term tags identifying new vocabulary words, and wherein the step of compiling the electronic textbook collects course elements associated with term tags into a glossary.

It is thus another feature of at least one embodiment of the invention to provide for automatic generation of glossary or definition sections.

These particular objects and advantages may apply to only some embodiments falling within the claims and thus do not define the scope of the invention.

DETAILED DESCRIPTION OF THE INVENTION

System Overview

Figure 1:
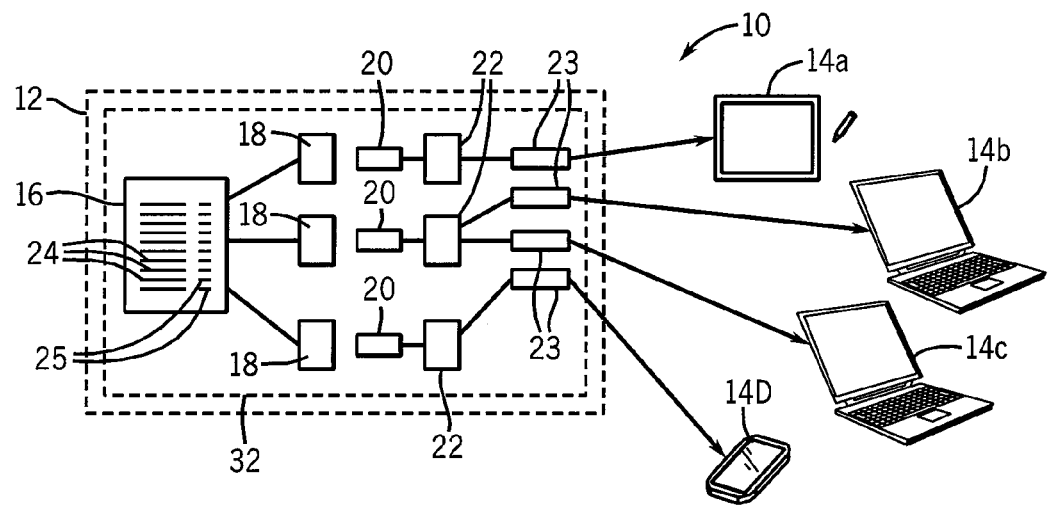
FIG. 1 is a block diagram showing the processing of an authored content file having course elements in author-order to produce multiple versions of electronic textbooks for different display devices.

Referring to FIG. 1, an electronic textbook versioning system 10, per the present invention, may provide one or more servers 12 for creating "published" electronic textbooks 23 provided to students via electronic textbook viewers 14. The electronic textbook viewers 14 may represent a variety of different technologies including, for example, a tablet 14a, a standard desktop or laptop computer 14b, and/or a portable device such as a cell phone or personal digital assistant 14c. It is expected that additional equivalent devices will be developed in the future.

The server 12 may hold a content file 16 made up of multiple course elements 24 being, for example, blocks of untyped text, images, or media files. Ideally, the course elements are at a granularity of a single paragraph or single image or the like. Generally, the course elements 24 in the content file 16 are in an author-order and collected within author generated logical groupings (sections). Within this order and section grouping, however, the course elements 24 exist independently and are independently tagged by "content identification tags" 25 as will be described below. Generally, the content identification tags 25 classify the content of the course element 24 as distinct from its format and provide a unique identification of the particular course element, for example, with a serial number or human readable character string. As tagged, the course elements 24 of the content file 16 present, in essence, a fine-grain database of course elements 24 at a resolution of a single paragraph or single image. This level of resolution permits manipulation by a non-author with little risk of distortion of the content.

The abstracted content file 16 may be processed by a versioning program 32, to be described in more detail below, executed on the server 12. In this regard, the versioning program 32 uses one or more version files 18, each of which map course elements 24 of the content file 16, identified by the content identification tags 25, to corresponding elements in pre-publication versions 20 of the textbook. A typical pre-publication version 20 will have a subset of course elements 24 from the content file 16 in a different order than the author-order of the content file 16 and possibly with a different logical grouping.

Each of the pre-publication versions 20 may be further modified by the versioning program 32 according to a device file 22 that formats the pre-publication versions 20 according to the content identification tags to create published electronic textbooks 23, each appropriate for a different electronic textbook viewer 14.

Figure 2:
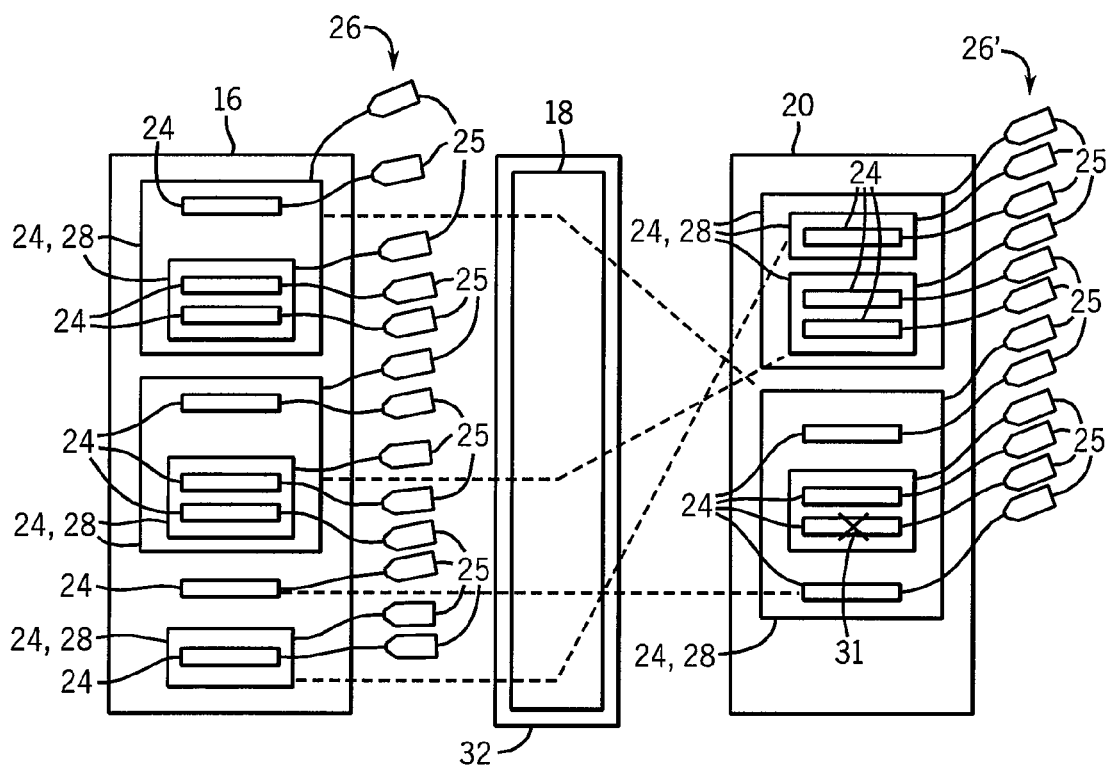
FIG. 2 is a detailed version of a portion of the block diagram of FIG. 1 showing the mapping of course elements in an author-order to different pre-publication versions according to multiple course version files.

Referring to FIG. 2, the abstracted content file 16 may include logical groupings, for example, sections 28 containing either additional sections (recursively) or course elements 24 with both the sections 28 and the course elements 24 in an author-order 26. As used herein, the sections 28 are also considered course elements 24.

Sections 28, for example, may collect course elements 24 comprised of paragraphs, images, goals, quizzes, questions and more as will be described below, each of which is associated with a different classification of content for the content identification tags 25. As noted, the content identification tags 25 describe qualities of the content largely independent of its display properties. For example, one type of course element 24 is a title that indicates an embracing concept for the succeeding text but that does not require or denote a particular display format. Title is one type of content identification tag 25.

The version files 18 used to produce the pre-publication versions 20 may be simply a list of identified course elements 24 (using the identification portion of the content identification tags 25) in a version order. As such, the version files 18 do not duplicate the course elements 24 but are simply pointers to those course elements within the content file 16. In this way, should the content file 16 be updated or revised, new pre-publication versions 20 may be created without necessary modification of the version files 18.

As noted, generally the version files 18 map particular course elements 24 to elements of the pre-publication versions 20 in a version-order 26' that differs from the author-order 26 of the content file 16 and which may have sections 28 providing different logical groupings. In this way, the pre-publication versions 20 may cover or emphasize different educational topics or provide a different educational focus. The particular version files 18, and thus the pre-publication versions 20, may be assembled by an educational specialist who creates the version files 18 without need for substantial input from the author and without any modification of the content file 16. Note that the course version files 18 may operate to select the entire sections 28 of the content file 16 identified by section tags in the content file 16 thereby selecting all of the individual course elements 24 within a section 28. Or, the version file 18 may operate to select individual course elements 24 from within sections 28. When an entire section 28 is selected, individual course elements 31 within the section 28 may be deleted. Thus, the process of assembling the pre-publication versions 20 can make use of the author organizational structure but may also freely modify that structure. In addition, the version file 18 may introduce new sections to impose a new order to the content elements 24. This will be described in more detail below.

Figure 3:
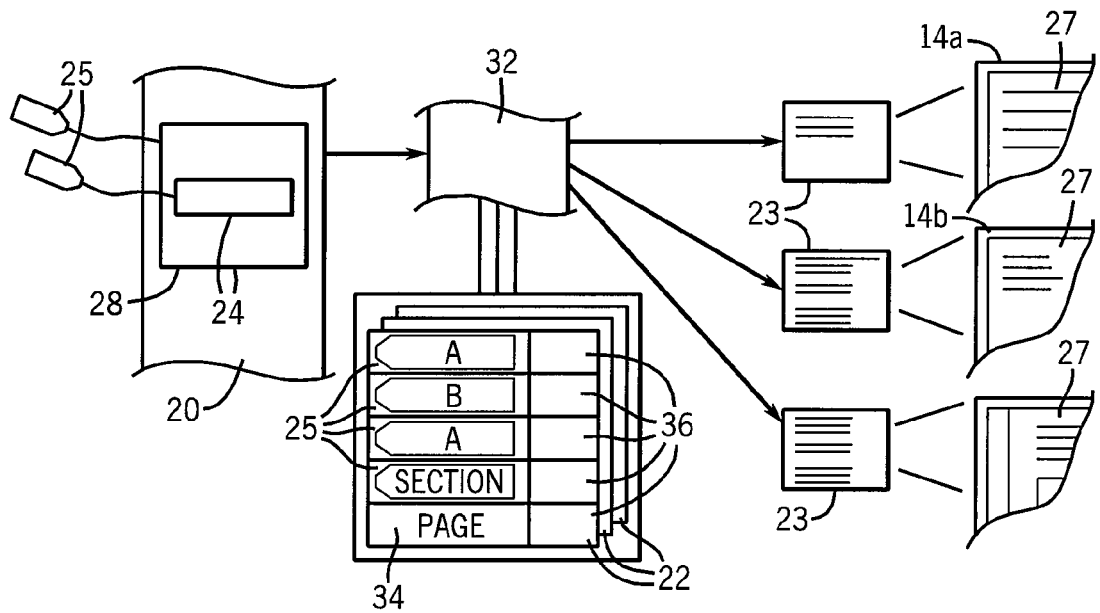
FIG. 3 is a detailed view of a device file and formatting engine of FIG. 1 showing the formatting of a pre-publication version of the electronic textbook to provide published versions viewable on different text readers.

The pre-publication versions 20 retain the content identification tags 25 of the selected content elements 24 as will be used in the formatting process. Referring now to FIG. 3, the pre-publication versions 20 may be further operated on buying the versioning program 32 using the device files 22 to produce the published electronic textbooks 23 suitable for downloading to different electronic textbook viewers 14a-d to be compatible with their different hardware and different displays 27. The device files 22 link content identification tags 25 to formatting instructions 36. During the formatting process, the course elements 24 are divided into pages according to information about the device associated with the formatting templates 30. Each of these pages is also associated with formatting instructions.

In this process, the program 32 reads the content identification tags 25 and applies the formatting instructions from the associated device file 22 to the associated course element 24. In the event of conflict between the formatting instructions of a particular course element 24, its section and page, priority is given to the formatting instructions for the course elements 24 then to the formatting instructions for the section and finally to the formatting instructions for the page. Thus, for example, if a formatting instruction for a particular course element 24 of a title is boldface, this takes precedent over a non-boldface formatting instruction of the section or the page. This priority may be altered by explicit declaration.

Formatting instructions may include, for example, selection of font type and size, centering, columns, tabulations, margins, display width and height, display resolution and the like. To some extent, the device files 22 for different textbook viewers 14*a*-*d* will be similar but ultimately each device file 22 will produce a different published electronic textbook 23 from a single content file 16.

System Hardware Overview

Figure 4:
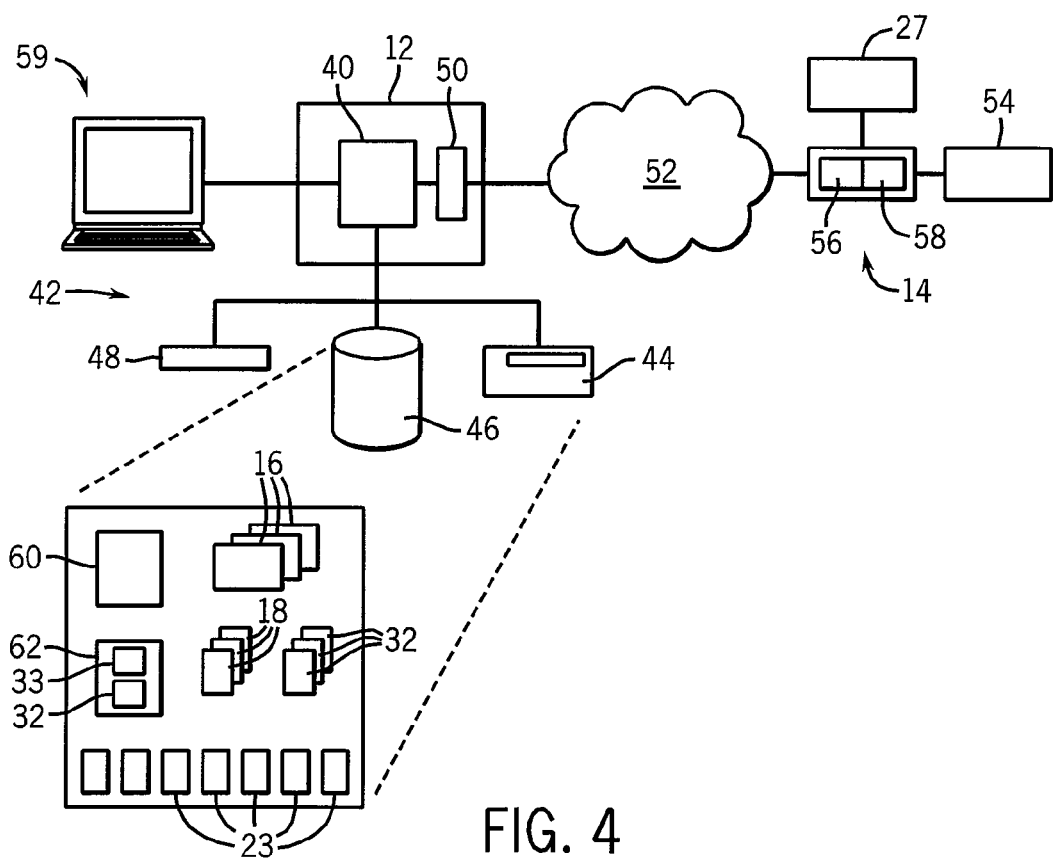
FIG. 4 is a figure showing an example architecture of a server for use with the present invention having a process there communicating with memory components holding programs and files as will be described.

Referring now to FIG. 4, the server(s) 12 maybe constructed according to well-known principles and may include one or more processors 40 communicating with memory components 42, for example, removable media 44, fixed media 46 such as disk drives, and solid-state memory 48. The processors 40 may communicate with a network interface 50 to the Internet 52 or the like and thus with the remote electronic textbook viewers 14. Other communications systems can also be employed.

The memory components 42 may hold an operating system 60 including, for example, a server stack, as well as the publishing engine 62 of the present invention including a version editor 33 and a versioning program 32, and further holding a learning management program of conventional design as well as the data of the content files 16, version files 18, device files 22 and published electronic textbooks 23 for serving to the electronic textbook viewers 14.

A programming terminal 59 may communicate with the server to provide for control of the versioning and publishing process as will be described.

The remote viewing electronic textbook viewers 14 may include a display 27, a keyboard or other entry device 54, an electronic processor 56, and memory 58 for holding the published electronic textbooks 23 or a portion thereof.

Generation of Version Files

Figure 5:
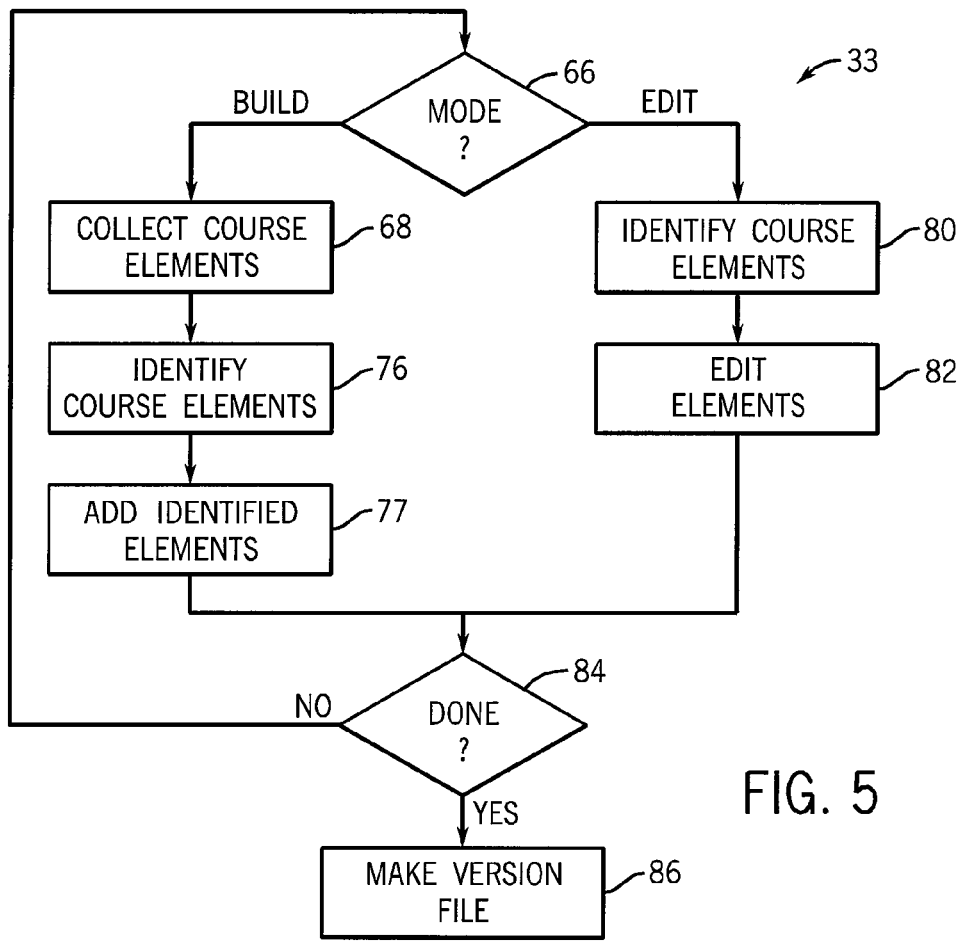
FIG. 5 is a flow chart of a program executable by the server system of FIG. 4 for generating the course version files.
Figure 6:
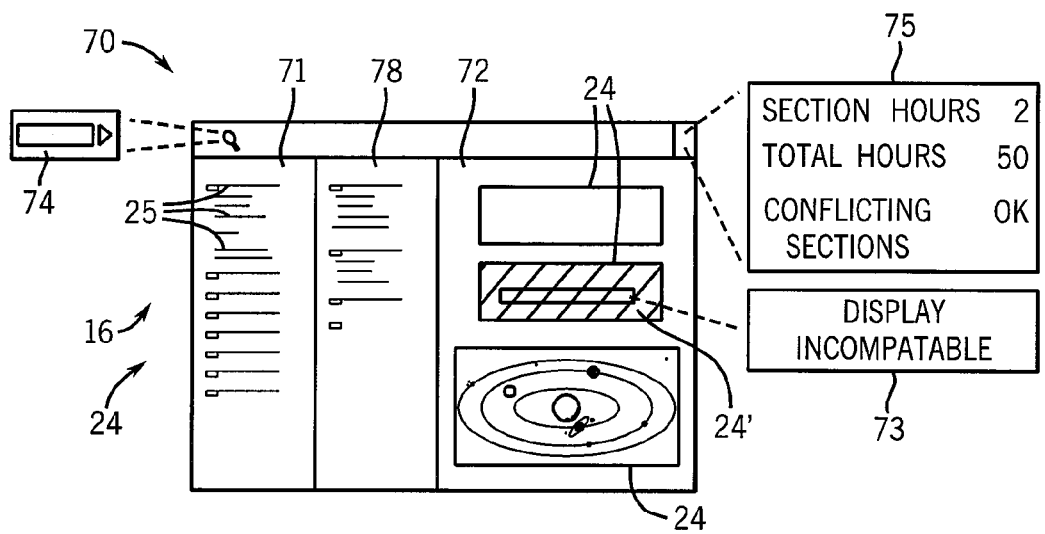
FIG. 6 is a representation of a screen display produced by the program of FIG. 5 during the versioning process of the program of FIG. 5.

Referring now to FIGS. 5 and 6, an important step of the versioning process is the production of the version files 18 using the version editor 33. Version editor may be executed on the server 12 or a similar electronic computer.

As indicated by process block 66, a first step in creating a version file 18 may allow the user to select one of two editing modes: a build mode for collecting course elements 24 or an edit mode for editing the collective course elements 24. As noted above, this process does not in fact collect or add actual course elements 24 but simply captures their collection and organization in the index of a version file 18.

In the build mode, as indicated by process block 68, the operator may be presented with a display 70 (shown in FIG. 6) having a first columnar window 71 presenting a hierarchical display of content identification tags 25 of the content file 16 in author order. Individual content identification tags 25 may be expanded to show their associated content or, preferably, can be selected, for example by highlighting with a mouse, for display in a display pane 72.

While course elements 24 may be selected by scrolling through the hierarchical display of the first window 71, course elements 24 may also be identified in the build mode by using standard search tools implemented in a search window 74, allowing the operator to search for particular types of content identification tags 25 or particular content identification tags 25. This can be particularly powerful for "object tags" described below which allow other content elements to be linked to common thematic concepts. Alternatively or in addition, the text of particular course elements 24 may be the subject of the search.

Once course elements 24 are obtained, as indicated by process block 76, for example as the results of the search, particular course elements 24 may be identified (for example by highlighting) to be included in the course version file 18. The highlighted course elements 24 are then displayed in unformatted version in the display pane 72.

Per process block 77, highlighted course elements 24 may then be moved to the course version file 18 to be displayed in columnar window 78 generally matching window 71 showing hierarchically the construction of the course elements 24 in the version file 18. The course version file 18, as noted before, is simply a list of course elements 24. Because of the sequential selection process, it will be understood that course elements 24 in window 78 (and thus in the version file 18) may be in an arbitrary order with respect to the author order of the course elements in window 71.

The operator may identify, at the beginning of the development of the version file 18, a target electronic textbook viewer 14 that will be used for this particular version of the electronic textbook. This identification can be used to flag those course elements 24' that cannot be displayed on that particular electronic textbook viewer 14. For example, for compatibility reasons, a course element 24 involving a video file may be highlighted as incompatible. This highlighting may be, for example, by a shading of the course element in pane 72 and appropriate caption 73.

When the operator selects an entire section (delineated by section tags to be described) from the window 71, a course length variable, for example, in units of fractions of hours of teaching time, associated with that section by the author, maybe be read and collected with the course length variables of previously selected sections to provide course length statistics in a display 75 providing the operator with an indication of the total course length of the material selected so far as well as the time associated with the currently highlighted section.

Other useful information may also be presented to the operator, including an indication as to whether duplicate and hence conflicting sections have been previously selected.

Referring still to FIG. 5, in an alternative edit mode, identified course elements 24 in window 78, per process block 80, may be edited using standard editing commands such as cut, paste, delete, and re-order (drag-and-drop) to permit further adjustments of the course elements that will be concurrently displayed in the display pane 72. In this process indicated by process block 82, the operator may add new section tags and collect course elements 24 in hierarchically nested section tags to provide an organizational format for the course elements 24 possibly unanticipated by the author.

As indicated by process block 84, when this process is done, a version file 18 is created as indicated by process block 86. As noted, the version file is simply a mapping set of pointers (possibly including new section tags) and thus is relatively compact and can be used even when changes have been made in the content file 16 or per sample to update or correct it.

Publication Process

Figure 7:
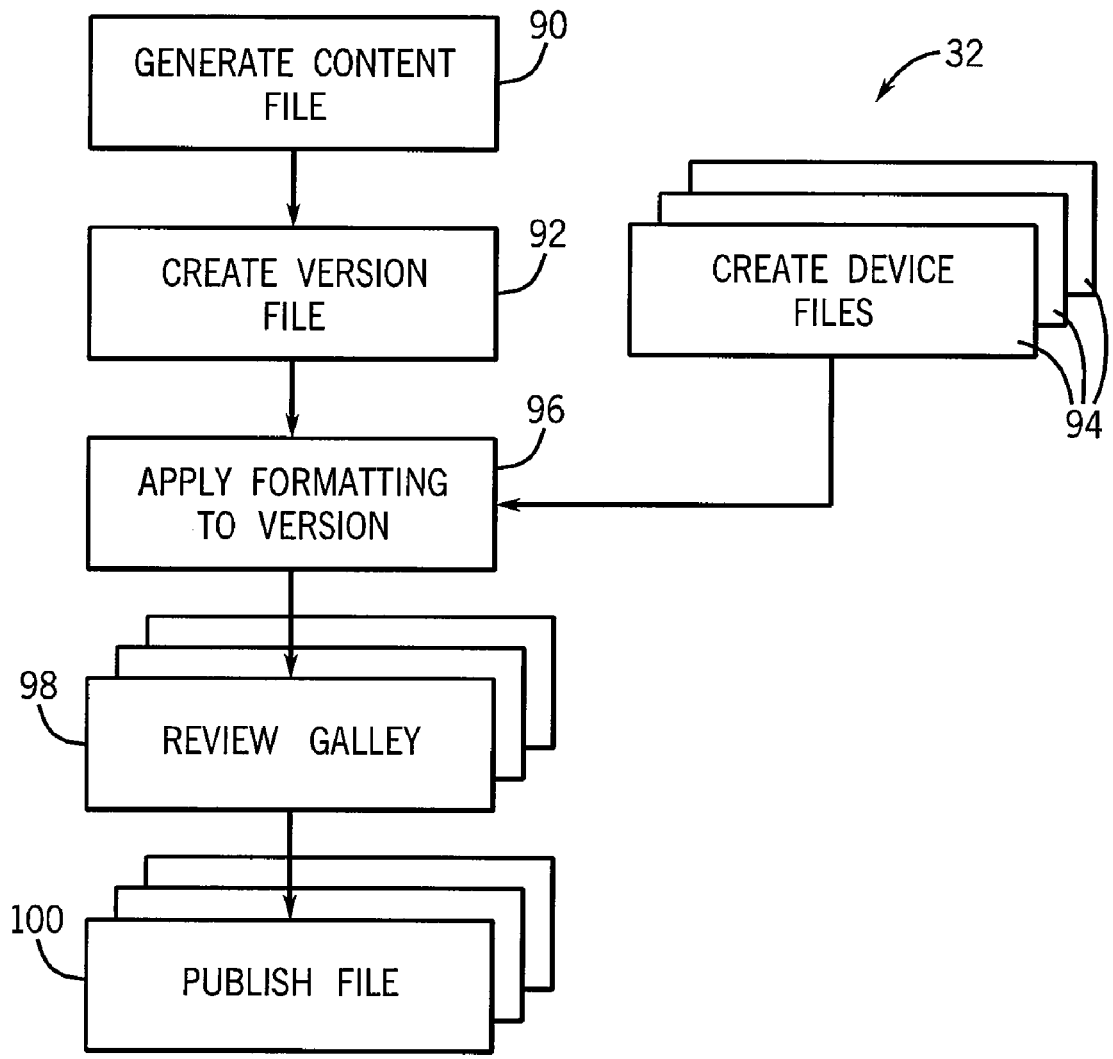
FIG. 7 is a flow chart of a program executed by the server in FIG. 4 generating different published electronic textbook versions.

Referring now to FIG. 7, the entire versioning process making use of this version file 18 begins as indicated by process block 90 with the generation of the content files 16. This authorship process generally involves a collection of the necessary prose, images, and the like (for example using a standard editing program) which comprise the course elements 24. An important part of the authoring process is tagging the course elements 24 with content identifier tags 25. The content identifier tags 25 are text elements offset in "< >" symbols, for example in the manner XML files. The present invention contemplates the following content identifier tags 25.

Listing of Content Identification Tags

1. <assignment>
Description:
   The <assignment> item type is used to define assignments that are used in the course. The use of <assignment> items allows for multiple assignments to be defined and styled.
Attributes:
   id (string): Allows goals to be identified for later.
   refid (string): Allows for assignments to be linked to references.
   title (string): Provides a friendly title for the assignment.
   value (integer): Specifies the number of points available for this assignment.
Example:

Note:
   This assignment has the student submit two of the four possible questions to submit. The directions provide the timeframe to turn it in in. Some of the questions include media elements of audio/images, while other questions are simple text.

2. <goal>
Description:
   The <goal> item type is used to identify a list of goals for content. Goals are meant to work along with the objectives, but can be displayed differently.
Attributes:
   id (string): Allows goals to be identified for later.
   refid (string): Allows for goals to be linked to references.
Example:
   <goal id="goal1">Build a working model rocket.</goal>

3. <image>
Description:
   The <image> tag is used to define an image that is displayed.
Attributes:
   alt (string): Provides alternative descriptions of images for accessibility reasons.
   id (string): Allows for the image element to be identified.
   refid (string): Allows content items to be referenced back to the original sources. If multiple sources should be referenced, enter each ID separated by a single space.
   copyrightcode (string): Allows for the copyright status of the referenced material to be listed.
   width (integer): Defines how wide the image is.
   height (integer): Defines how tall the image is.

```
<assignment id="assign1" title="Birdwatching" value="10" submissionsallowed="2">
    <assignmentdirections>
        <text>You have two days to complete this assignment.</text>
        <text>Choose two of the questions below to answer.</text>
        <text>The question responses must be typed 2-3 pages in length.</text>
    </assignmentdirections>
    <question>
        <image Alt="flawed data graph">bad-data.jpg</image>
        <text>Identify two 3 data points in this graph that are out of the realm of
        possibility. Provide possible reasons for their problem, and indicate how they
        flaws can be discounted or corrected.</text>
    </question>
    <question>
        <text>Provide a detailed analysis of the bird watching fieldtrip, and indicate
        the points that had significant impact on your appreciation of different bird
        types, as well as the surrounding environment.</text>
    </question>
    <question>
        <media id="mp3q1" mimeType="audio/mpeg">birdchirp.mp3</media>
        <text>Listen to the audio, and identify the type of bird that is in the audio.
        Listen for different background noicses that could be considered
        environmental contamination, and explain the effect on the bird from
        it.</text>
    </question>
    <question>
        <text>Using your field notes, and available topigraphical maps from
        different periods, extrapolate the growth or reduction of the natural habitat
        that was observed during the birdwatching fieldtrip, and identify a least 3
        impacts on the bird population from the changes.</text>
    </question>
</assignment>
```

Example:

```
<image id="page2_mountain">Content/mountain.jpg</image>
```
Please Note: This image is in the "Content" folder.

4. <maple>

Description:

The <maple> tag is the document root tag. All of the other item types must be placed within the <maple> tags.

Example:

```
<?xml version="1.0" encoding="UTF-8"?>
<maple xmlns:xsi="http://www.w3.org/2001/XMLSchema-instance"
xsi:noNamespaceSchemaLocation="../Documentation/maple.xsd">
    <section id="lesson1" enabletracking="true">
    <objective id="programob1">This is program
    Objective 1</objective>
    <text id="page1_Title">Lorem Ipsum</text>
</maple>
```

5. <margin>

Description:

The <margintext> item type is used to define how content that is useful to the course, but doesn't need to be displayed directly should be shown.

Attributes:

id (string): Allows margin text to be identified of later use.

refid (string): Allows for margin text to be linked to references.

Example:

```
<margin id="marginText1"> This is information that should appear in the margin.</margin>
```

6. <media>

Description:

The <media> tag is used to define different types of media content that one may want to display in a course. Media can be of many different types including audio, video, or even interactive elements. Media types are specified by their corresponding mimeType. Following are some different mimeTypes Flash movie=application/x-shockwave-flash Mp3 audio=audio/mpeg Flv video=video/x-flv Attributes:

id (string): Allows the Media element to be identified later.

refid (string): Allows media items to be referenced back to the origina sources. If multiple sources should be referenced, enter each ID separated by a single space.

mimeType (string): Indicates what type of media it is through mimetype.

Example:

```
<media id="page3_Media1" mimeType="application/x-shockwave-flash">
Content/internetServices.swf</media>
```

Note:

This example is a flash movie as indicated by the mimeType and it is located in the "Content" folder. Not all media will be playable in all display types. Care should be take to make appropriate matches of content to display.

7. <objective>

Description:

The <objective> element is used list and define the objectives for the lesson. Objectives can then be referenced by other content items, to show which pieces of content help support which objectives.

Attributes:

id (string): An identifier to allow the objective to be specifically referenced.

refid (string): Allows objectives at this level to be reference objectives at a higher level.

This allows for a "hierarchy" of objectives to be built. By building the hierachy the broad objectives from a course level can be further refined as to how they are implemented and supported at smaller lesson levels.

Example:

```
<objective id="objective1">Given expressions involving more that
one mathematical operation, the student will simply them using the correct
order of operations.</objective>
```

8. <quote>

Description:

The <quote> element is used to define a section of quoted text. The <quote> element differs from <text> in that is has a specific attribute for the attribution of the quote.

Attributes:

id (string): Allows quotes to be identified for later.

refid (string): Allows for quotes to be linked to references.

attribution (string): Who is attributed with the quote.

Example:

```
<quote id="twainquote" attribution="Mark Twain">Get your facts first,
then you can distort them as you please. </quote>
```

9. <quiz>

Description:

The <quiz> section defines a quiz. Quizzes have a number of different parameters, that control how the quiz is delivered to students, as well as any restrictions on duration or similar controls. Note: these definitions may require additional options, or may be over-ruled by the display engine, especially if used inside of an LMS. Quizzes contain the additional sub-element types of <question> and <questiongroup>.

Attributes:

id (string): Allows for the image element to be identified.

questionretryamount (integer): Specifies how many times a question can be attempted before being disabled.

feedbackdisplaymode (string)[none, cumulative, lastpicked]: Controls how the feedback will be displayed.

feedbackdisplaytrigger (string)[never, onanswer, onsubmit]: Controls when the feedback will be displayed.

timelimit (integer): How much time is give to complete the quiz. A value of 0 (default) indicates no time limit.

minimumpassingscore (integer): How many points are required to pass the quiz.

recordscorefield (string): What field should record the quiz score? Omit or leave empty to indicate the quiz is not recorded.

Example:

```
<quiz id="quiz1" questionretryamount="2"
feedbackdisplaymode="cumulative"
feedbackdisplaytrigger="onsubmit" minimumpassingscore="1"
    <question refid="AssessQ1" value="1"/>
</quiz>
```

10. <question>

Description:

The <question> tag is used to identify a question in a quiz from the <questiondefinitions> group. Questions are not created in this area, they are only linked to. This makes the reuse of questions much easier, as questions can be linked into multiple places, without having to re-write the question. For example, the same question could be shown at the beginning of a lesson in a pretest fashion, and then shown again at the end of the lesson to show knowledge gained.

Example:
<question refid="AssessQ1" value="1"/>

11. <questiongroup>

Description:
The <questiongroup> tag is used to create a question pool inside of the quiz. question groups will contain multiple <question> elements. The quiz will then randomly choose some of the questions (the amount is one of the questiongroup attributes) to be displayed in a random manner. This can help to improve academic integrity, or to create variety in a self test area.

Attributes:
    numbertouse (integer): Allows for a pool of questions to be used, of which only a specified number of question are selected.

value (integer): Indicates how much each question is worth that is used.

Example:

```
<questiongroup numbertouse="2" value="2">
    <question refid="AssessQ1"/>
    <question refid="AssessQ2"/>
    <question refid="AssessQ3"/>
    <question refid="AssessQ4"/>
</questiongroup>
```

12. <questiondefinitions>

Description:
The <questiondefinitions> item type is a container to hold all of the questions that are defined in the course. The questions that are defined in this area are then referenced from the quiz element. Questions that are defined in the <questiondefinitions> container may include feedback elements, but they do not include point values, as points are assigned at the quiz/question level. The different question types are listed below.
    <mc> Multiple Choice:
    <sa> Short Answer:
    <fb> Fill in the Blank:
    <ma> Matching:

13. <reference>

Description:
The <reference> item type is used to act as a container for reference information for the content that is used in a course. <reference> material is linked to other item types by using the referenceid attribute on the item, and making sure the value is the same as the id attribute of the reference node.

Attributes:
    id (string): Reference identifier so that content can be linked back to the appropriate reference.
    copyrightcode (string): Allows for the copyright status of the referenced material to be listed.

14. <section>

Description:
The <section> item type is used to create groupings of content. All of the other maple element types exist inside of the <section> node. These node types are only used for the grouping of content, allowing for content developers to create logical breaks and containers as the seem necessary. These are the only maple defined node types that can be put inside of other sections allowing for complex structures to be built.

Attributes:
    id (string): Id tag to allow the sequence to be referenced.
    length (integer): Allows for optional information to be included on the expected time to complete this section of material. Format is of time in minutes.
    title (string): Allows for sections to be "titled." The display of the title is controlled by the display engine, and may be affected by the section's place in any existing hierarchy.

Example:

```
<section id="lesson1" >
    <text id="page1_Title">Lorem Ipsum</text>
    <text id="page1_Txt1">Lorem Ipsum is text of the printing and typesetting industry.
    Lorem Ipsum has been the industry's standard dummy text ever since the 1500s,
    when an unknown printer took a galley of type and scrambled it to make a type
    specimen book. It has survived not only five centuries, but also the leap into
    electronic typesetting, remaining essentially unchanged.It has survived not only five
    centuries, but also the leap into electronic typesetting, remaining essentially
    unchanged.</text>
</section>
```

15. <term>

Description:
The <term> element is used to define a term in the course. Elements that are defined in a <term> tag are able to be automatically added to the glossary tool.

Attributes:
    id (string): Id tag to allow the terme to be referenced.
    refid (string): Allows terms to be referenced back to the original sources. If multiple sources should be referenced, enter each ID separated by a single space.
    term (string): The specific term being identified.

Example:

```
<term id="pizza" term="pizza">A round food that is made by throwing
dough in the air, and then covering it with various toppings.</term>
```

16. <text>

Description:
The <text> item type places is a container for text content. The <text> element will allow text of any size to be included in it. However care must be taken to make the <text> elements of a manageable size. If a large section of content is placed inside it, then the ability to render out the content on smaller pages is reduced. If the <text> fields are too small, then many elements must be combined to make a useful page of content.

Attributes:
    id (string): Allows for the text element to be identified.
    refid (string): Allows content items to be referenced back to the original sources. If multiple sources should be referenced, enter each ID separated by a single space.

objectiveid (string):
Example:

```
<text id="page1_Txt1">Lorem Ipsum is <b>simply dummy</b> text of the printing and
typesetting industry. Lorem Ipsum has been the industry's standard dummy text ever since
the 1500s, when an unknown printer took a galley of type and scrambled it to make a type
specimen book. It has survived not only five centuries, but also the leap into electronic
typesetting, remaining essentially unchanged. It was popularised in the 1960s with the
release of Letraset sheets containing Lorem Ipsum passages, and more recently with
desktop publishing software like Aldus PageMaker including versions of Lorem Ipsum.
Lorem Ipsum is simply dummy text of the printing and typesetting industry. Lorem Ipsum
has been the industry's standard dummy text ever since the 1500s, when an unknown printer
took a galley of type and scrambled it to make a type specimen book. remaining essentially
unchanged.</text>
```

17. <weblink>

Description:
   The <weblink> item type is used to create links to content that is not included in the course material.

Attributes:
   href (string): Web Address for the link.
   id (string): Allows for the weblink element to be identified.
   refid (string): Allows weblinks to be referenced back to the original sources. If multiple sources should be referenced, enter each ID separated by a single space.

Example:
   <weblink href="http://www.apple.com" id="weblink1">Click here to go to the Apple Website.</weblink>

Example of a Simple Maple Document

```
<?xml version="1.0" encoding="UTF-8"?>
<maple xmlns:xsi="http://www.w3.org/2001/XMLSchema-instance"
   xsi:noNamespaceSchemaLocation="../Documentation/maple.xsd">
   <section id="welcomecontent">
      <text id="textelement1">Welcome to the course.</text>
      <image id="image1">content/welcomeimage.jpg</image>
   </section>
   <section id="lessongroup1">
      <objective id="obj1">place objective here</objective>
      <objective id="obj2">place objective here</objective>
      <section id="lesson1task1">
         <text id="textelement2">This is where the content goes
         for task 1</text>
      </section>
      <section id="lesson1task2">
         <text id="textelement3">This is where the content goes
         for task 2</text>
      </section>
   </section>
</maple>
```

The following provides a sample content file 16 using many of the above content identifier tags 25:

Example Content File

```
<maple>
<section id="solar system">
   <objective id="system1"> Basic Proficiency with Introductory Physical Science
   Topics</objective>
      <objective id="system1a"> Understanding of Basic Astronomical Vocabulary </objective>
   <objective id="system2"> An Appreciation Of Historical And Cultural Influences In
   Science</objective>
      <section id= "discovery" length=0.5 > Discovery and Exploration </section>
         <text id="discovery1title">Early Explorers"</text>
         <text id="discovery1" refid="Watson[2005]" objectiveid="basic_concepts"> Early
         man did not recognize the existence of the solar system or the place of the Earth
         with in it. The Earth was understood to be stationary, at the center of the universe,
         and categorically different from the heavens and objects that moved through the
         skies. <weblink href="www.copernicus.edu" id="copernicus">Nicolas Copernicus
         </weblink> was the first to develop a mathematically predictive model with the
         earth rotating around the sun with other planets, however earlier Greek and Indian
         scholars had speculated on a <term> heliocentric </term> solar system
         </text>
         <image id="solar system perspective" copyrightcode=Prentice[52]" width=600
         height=300 >Content/solar.jpg</image>
         <media id="page3_Media1" mimeType="application/x-shockwave-flash">
      <section id= "structure" length=0.25 > Structure </section>
      <section id= "inner solar system" length=0.25 > The Inner Solar System </section>
      <section id= "outer solar system" length=0.25 > The Outer Solar System </section>
      <section id= "trans-Neptune" length=0.25 > The Trans-Neptunian Region </section>
      <assignment id= "assignment" > On Your Own </section>
      <quiz id= "quiz"> Test Your Knowledge </section>
</section>
```

In this example, only one section has been expanded for clarity, however, it can be seen how sections may be nested and content elements identified to particular objectives to assist in the versioning process. Generally, section tags may be used to link objectives to content elements contained within the same section tags as well as by explicit declaration, a feature that can be used effectively in searching for content in creating a version file 18.

Referring again to FIG. 7, at process block 92, the course version files 18 may be created as described above with respect to FIGS. 5 and 6. As discussed, the course version files 18 may create pre-publication versions 20 substantially without formatting.

At this time, multiple device files 18 may also be generated as indicated by process blocks 94. Pre-publication versions 20 produced by the course version files 18 may then be formatted using the device files 18 as indicated by process block 96. Published galleys may be reviewed per process block 98, and at process block 100 published electronic textbooks 23 to be served to the end electronic textbook viewers 14 created.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for versioning learning materials comprising:
   multiple spatially independent electronic textbook viewers;
   an electronic computer system communicating with the electronic textbook viewers including at least one processor and data storage component, the data storage component holding:
   (a) at least one content file including a set of course elements being components of an electronic textbook including at least text and images, each course element having a content identification tag describing content independent of its display properties, the course elements arranged in an author order;
   (b) multiple course version files identifying subsets of the course elements in a course version order different from the author order, the course version order defining an order to course elements of text and images as may be concurrently displayed on a display of an electronic textbook viewer, the course version files providing an ordered list of course elements;
   (c) a publishing engine program;
   the processor executing the publishing engine program to create multiple electronic textbook versions for multiple different users by selecting and ordering the single given content file based on multiple different course version files matched to the multiple different users and to serve the multiple electronic textbook versions to different electronic textbook viewers, wherein the ordering of a content file according to a course version file determines a display order of the course elements concurrently displayed on a display in different electronic textbooks presented to the different users by arranging the course elements according to the ordered list of the course order of each version file.

2. The system of claim 1 wherein the course version files provide a mapping from the content file without substantial reproduction of the content file so that the course version files may be applied to subsequent updates of the content file to provide an updated electronic textbook version.

3. The system of claim 1 wherein the content identification includes margin tags indicating marginalia, title tags indicating titles, question tags indicating questions related to other core course elements, and quiz tags related to quiz questions about other course elements.

4. The system of claim 1 wherein the content identification includes logical section tags collecting other course elements in logical sections of thematically related material.

5. The system of claim 1 wherein the content file further includes viewer requirement tags identifying course elements requiring specialized viewer capabilities for display and wherein the processor executes the publishing engine program to discourage content elements incompatible with the electronic textbook viewer.

6. A system for versioning learning materials comprising:
   multiple spatially independent electronic textbook viewers;
   an electronic computer system communicating with the electronic textbook viewers including at least one processor and data storage component, the data storage component holding:
   (a) at least one content file including a set of course elements being components of an electronic textbook including at least text and images, each course element having a content identification tag describing content independent of its display properties, the course elements arranged in an author order;
   (b) multiple course version files identifying subsets of the course elements in a course version order different from the author order, the course version order defining an order to course elements of text and images as may be concurrently displayed on a display of an electronic textbook viewer, the course version files providing an ordered list of course elements;
   (c) a publishing engine program;
   the processor executing the publishing engine program to create multiple electronic textbook versions for multiple different users by selecting and ordering the single given content file based on the multiple different course version files matched to the different users and to serve the multiple electronic textbook versions to different electronic textbook viewers, wherein the ordering of a content file according to a course version file determines a display order of the course elements concurrently displayed on a display in different electronic textbooks presented to the different user by arranging the course elements according to the ordered list of the course order of each version file wherein the data storage component further holds multiple device files describing formatting characteristics for different electronic textbook viewers and wherein the processor executes the publishing engine program to create the multiple electronic textbook versions by applying the formatting of at least one device file to the course elements selected by the course version file.

7. The system of claim 6 wherein the formatting of the device files is linked to the content identification tags of the course elements.

8. The system of claim 6 wherein the device files provide for a hierarchy of formatting instructions including course element level formatting instructions associated with content identification tags associated with displayed course elements, page-level formatting instructions associated with displayed course elements within a page defined by the electronic textbook viewer, and section-level formatting instructions related to section level content identification tags, wherein a priority of application of conflicting formatting instruction is from course element level to section level, with course element level formatting instructions overriding section level formatting instructions.

* * * * *